(12) United States Patent
Satterfield (10) Patent No.: US 10,981,653 B2
(45) Date of Patent: Apr. 20, 2021

(54) HOLDER ASSEMBLY

(71) Applicant: Johnny A. Satterfield, Chatsworth, CA (US)

(72) Inventor: Johnny A. Satterfield, Chatsworth, CA (US)

(*) Notice: Subject to any disclaimer, the term of this patent is extended or adjusted under 35 U.S.C. 154(b) by 0 days.

(21) Appl. No.: 16/408,246

(22) Filed: May 9, 2019

(65) Prior Publication Data

US 2020/0354063 A1  Nov. 12, 2020

(51) Int. Cl.
B64D 11/06 (2006.01)

(52) U.S. Cl.
CPC ...... B64D 11/0636 (2014.12); B64D 11/0646 (2014.12)

(58) Field of Classification Search
CPC .................. B64D 11/0636; B64D 11/0646
See application file for complete search history.

(56) References Cited

U.S. PATENT DOCUMENTS

| | | |
|---|---|---|
| 5,177,616 A | 1/1993 | Riday |
| 5,195,709 A | 3/1993 | Yasushi |
| 6,427,957 B1 | 8/2002 | Finneman |
| 7,604,291 B2 | 10/2009 | Vitito |
| 7,857,382 B2 | 12/2010 | Vitito |
| 2004/0245796 A1 | 12/2004 | Maierholzner |

*Primary Examiner* — Anthony D Barfield
(74) *Attorney, Agent, or Firm* — Matthew J. Spark; Stefan J. Kirchanski; Zuber Lawler LLP (57) ABSTRACT

A holder assembly, movable between stowed and deployed configurations, includes a holder including a flap configured to support a personal electronic device. The holder is configured to rotate between stowed and deployed positions. A latch assembly is configured to engage the holder in the stowed position, and a movement assembly is configured to automatically move the holder from the stowed position to the deployed position upon disengagement of the holder and latch assembly.

20 Claims, 10 Drawing Sheets

HOLDER ASSEMBLY

BACKGROUND

The present invention relates generally to support arms. More particularly, the present invention relates to a holder for a personal electronic device (PED).

Commercial airline companies strive to provide improved services for their customers as well as improving passenger comfort and convenience. Today, it is common for both private and commercial passenger aircraft to have an in-flight entertainment (IFE) system. An IFE system generally comprises an entertainment content source, such as a computer server having entertainment and/or information media (e.g., Internet access, movies, music, television shows and/or other entertainment media content) stored in digital format; and a wired or wireless (e.g., WIFI) networking system communicating entertainment media throughout the aircraft in response to passenger communications. On many airlines, it is standard for each passenger to have their own personal video display monitor associated with their chair or seat to provide the passenger with in-flight entertainment and/or information. The video display monitor can include a user interface wherein the passenger may provide touchscreen input to the IFE. However, although an airline may provide at least one video display monitor associated with one or more seats to provide passengers with entertainment and/or information, airlines are also aware that passengers use their own portable PEDs (e.g., notebook computer, media player, smartphone, tablet-style device, hand-held device, etc.) during a flight. These PEDs are capable of storing and playing music, video and entertainment digital files as well as being WIFI enabled. PEDs are commonly used on aircraft as more airlines offer passengers WIFI access in order to connect their PEDs to the IFE. Each passenger seat may include or be associated with a table tray providing a generally horizontal surface upon which the passenger places their PED. These table trays can be deployed from a seatback in front of a user or from an armrest of a passenger seat. However, some PEDs, such as smartphones and tablets, need to be held by the user in a position that allows the display screen on the PED to be seen by the passenger using it. If a PED is placed flat on a tray table with the display screen facing upwards, a passenger may have difficulty seeing the display screen due to the relative angle between the passenger's line of sight and the display screen. Images on the display screen may also be difficult to see due to light reflecting off the surface of the display screen. There has also been a challenge as to how to offer passengers a convenient location to not only view their PEDs, but also to store and charge their PEDs. The most common places to do so have been on the seatback, tray table, seat cushion or literature pocket. However, none of these solutions offer a convenient way to access the PED during flight. Furthermore, PEDs are not held in place by anything and a charging cable or the like connected to the PED may get snagged by a passenger's arm or leg, sending the PED the cable is connected to flying or smacking into a fellow passenger or a surface that damages the PED (not to mention the other passenger).

Accordingly, there is a need for a holder for holding a PED so that the display of the PED is clearly visible to a user during a flight aboard an aircraft. There is a further need for a holder movable between stowed and deployed positions. There is also a need for a holder that can be stowed within a seat console. There is a further need for a holder that can be stowed within a seat armrest. There is an additional need for a holder that can be retro-fitted onto an existing armrest. There is still a further need for a place to safely hold and use a PED. There is an additional need for a holder that will allow a passenger to "mount" the PED in a stationary location that is easily accessible and reduce the chance a charging cable or the like will get snagged. There is a need for a holder that maximizes the use of a limited space within an armrest by having one or more components serve one or more functions. There is an additional need for a holder that is easier to manufacture, assemble, adjust, and maintain. The present invention satisfies these needs and provides other related advantages.

SUMMARY

The present invention comprises a PED holder that supports at least one PED (e.g., a smartphone, a tablet device, etc.).

An improved holder assembly has been developed that holds a PED so that the display of the PED is visible to a user during a flight aboard an aircraft. The holder assembly is movable between stowed and deployed positions. The holder assembly can be stowed within a seat console. The holder assembly can be stowed within an armrest of a seat. The holder assembly can be retro-fitted onto an existing armrest. The holder assembly serves as a place to safely dock and use a PED. The holder assembly allows a passenger to "mount" the PED in a stationary location that is easily accessible and reduce the chance a charging cable or the like will get snagged. There holder assembly maximizes the use of a limited space within an armrest by one or more components of the holder assembly serving one or more functions. The holder assembly preserves the living space available to a passenger, and can be used without disturbing an adjacent passenger. The holder assembly is easier to manufacture, assemble, adjust, and maintain.

In an illustrative embodiment, a holder assembly is movable between stowed and deployed configurations. The holder assembly includes a holder having a flap configured to support a personal electronic device. The holder is configured to rotate between stowed and deployed positions. The holder assembly also includes a latch assembly configured to engage the holder in the stowed position, and a movement assembly configured to automatically move the holder from the stowed position to the deployed position upon disengagement of the holder and latch assembly.

The holder assembly further includes a housing within which the holder is disposed when the holder is in the stowed position. The flap is movable between stowed and deployed positions.

The latch assembly includes a main body having a latch portion configured to engage a portion of the holder sized and shaped to engage the latch portion. The latch assembly includes a main body having a stop portion preventing rotational movement of the holder beyond the deployed position. The latch assembly includes a main body having a button portion configured to move between depressed and undepressed positions, wherein the latch assembly disengages from the holder after the button portion moves from the undepressed position.

The holder assembly further includes a biasing assembly, wherein the latch assembly includes a main body having a button portion configured to move between depressed and undepressed positions, and the biasing assembly is configured to automatically move the button portion from the depressed position to the undepressed position.

The holder assembly further includes a biasing assembly, wherein the latch assembly includes a main body having a slot configured to engage a portion of the biasing assembly, and the slot limits movement of the main body relative to the biasing assembly.

The flap includes a recess configured to receive a portion of the personal electronic device, and an aperture configured for a cable to pass through to engage the personal electronic device.

The movement assembly is further configured to dampen deployment of the holder from the stowed position.

The holder assembly further includes a biasing assembly having a main body, a pin, and a biasing element, wherein the main body includes a bore configured to receive the biasing element and the pin, and wherein the pin engages the latch assembly.

In another illustrative embodiment, an armrest assembly includes an armrest, and a holder assembly.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The various present embodiments now will be discussed in detail with an emphasis on highlighting the advantageous features with reference to the drawings of various embodiments. The illustrated embodiments are intended to illustrate, but not to limit the invention. These drawings include the following figures, in which like numerals indicate like parts.

DETAILED DESCRIPTION

The following detailed description describes present embodiments with reference to the drawings. In the drawings, reference numbers label elements of present embodiments. These reference numbers are reproduced below in connection with the discussion of the corresponding drawing features.

As shown in FIGS. 1-14 for purposes of illustration, an embodiment of the present invention resides in a holder assembly 20 for a personal electronic device (PED) 22. The PED 22 can be in the form of various types of electronic devices including, but not limited to, a portable computer (e.g., a notebook computer), a media player, a smartphone, a tablet-style device, or other portable electronic devices containing music, video, and other content and/or capable of WIFI and/or BLUETOOTH access. The holder assembly 20 is movable between stowed and deployed configurations. The holder assembly 20 includes a holder 24 rotatably movable between a stowed position and a deployed position, a latch assembly 26 configured to engage the holder 24 when the holder 24 is in the stowed position, and a movement assembly 28 configured to automatically move the holder 24 from the stowed position to the deployed position upon disengagement of the holder 24 and latch assembly 26. The holder 24 includes a mount flap 30 configured to support a PED 22. The mount flap 30 is movable between a stowed position and a deployed position, and includes a holding portion 120 in the form of a recess sized, shaped, and configured to receive a portion of the PED 22, and an aperture 122 configured for a cable (not shown) to pass through to engage the PED 22. The aperture 122 allows a user/passenger to access a USB port or the like in order to re-charge a battery of the PED or connect the PED to the IFE system via an adapter cord/cable having a connector compatible with and engaging the PED on one end and a connector compatible with and engaging the USB port on the other end. In a further alternative, an adapter cord/cable connected to a wire harness (e.g., a wire harness connected to the IFE system or the like, where the wire harness can be in the form of a bundle of electrical wires with specialized connectors at each end) can be operationally connected to the PED, with the adapter cord/cable automatically retracting into the armrest 200 when disengaged from the PED 22. In an alternative, PEDs 22 containing music, video, and other content, could be similarly attached, and in some cases, could be integrated into the IFE system in such a way as to permit cooperative use of a video monitor integrated into an airline seat (e.g., integrated into the seatback of an airline seat facing a passenger or attached to a video arm deployable from a seat console, etc.) and related controls (i.e., effectively running the stored music and videos through the embedded IFE system).

Figure 4:
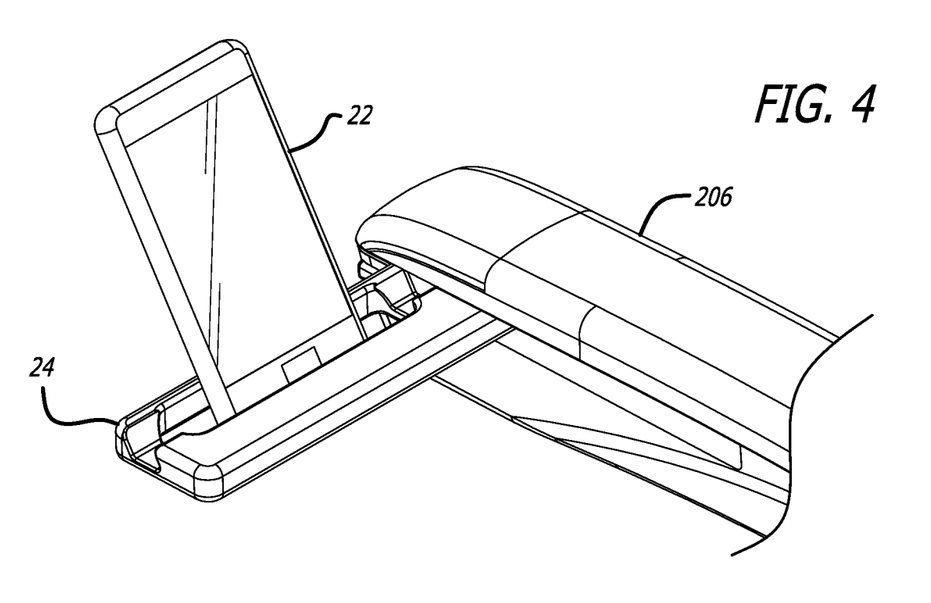
FIG. 4 is a perspective view of the armrest of FIG. 2 with the holder assembly in a fully deployed configuration; the holder of the holder assembly in its deployed position; and the base of the holder in its deployed position holding a PED in a portrait orientation.
Figure 5:
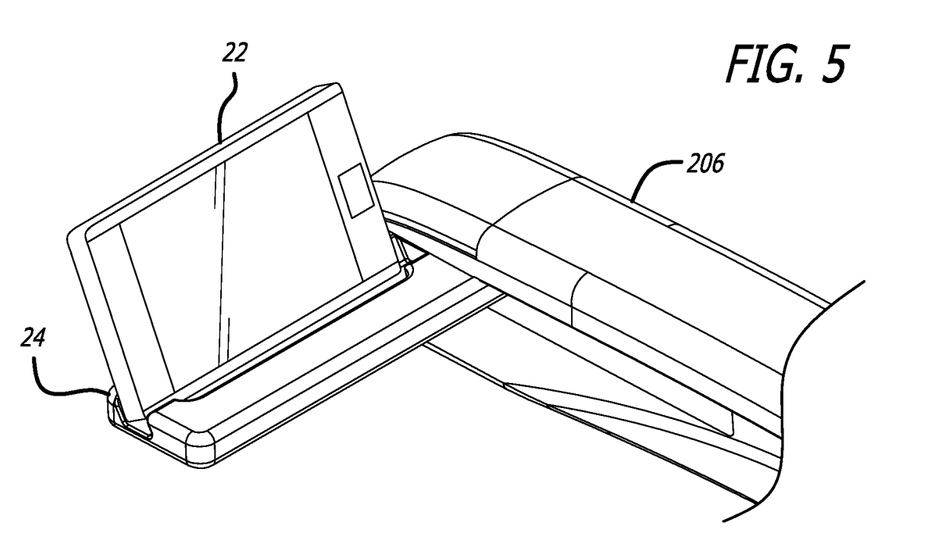
FIG. 5 is a perspective view of the armrest of FIG. 2 with the holder assembly in a fully deployed configuration; the holder of the holder assembly in its deployed position; and the base of the holder in its deployed position holding a PED in a landscape orientation.

The holding portion 120 may be sized and shaped so as to frictionally engage the PED 22 so as to hold the PED 22 in place. The holding portion 120 may be sized, shaped, and configured to hold a PED 22 in a portrait orientation, or a landscape orientation. For example, the holding portion 120 may be sized, shaped, and configured so that the PED 22 may only be held in a portrait orientation. Likewise, the holding portion 120 may be sized, shaped, and configured so that the PED 22 may only be held in a landscape orientation. Alternatively, the holding portion 120 is sized, shaped, and configured so that the user has the option to choose which orientation (i.e., portrait or landscape) the user wishes the mount flap 30 to hold the PED 22 in. The holding portion 120 includes a base 130, where the base 130, a first wall 132, and an opposite second wall 134 spaced apart by a space from the first wall 132 define an elongated channel, slot or groove of the mount flap 30 such that a PED 22 can be positioned on the base 130, between the first and second walls 132, 134. In an embodiment, the channel may be lined with a material, such as silicon, foam, rubber or the like in order to provide a shock-absorbing, resilient surface between the PED 22 and the mount flap 30 when the PED 22 is positioned in the holding portion 120, that also frictionally engages the PED 22 to hold the PED 22 in engagement with the mount flap 30 when positioned on the mount flap 30.

Figure 13:
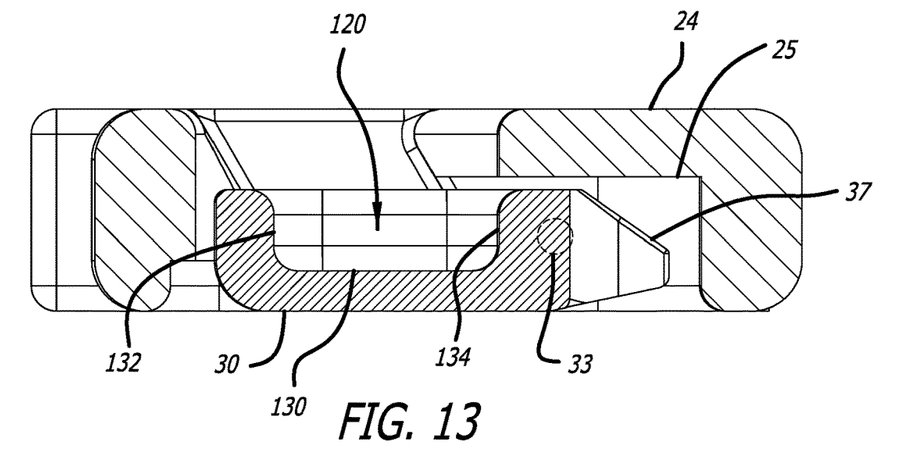
FIG. 13 is a cross-sectional side elevation view of the holder assembly in the semi-deployed position, with the base in the stowed position.
Figure 14:
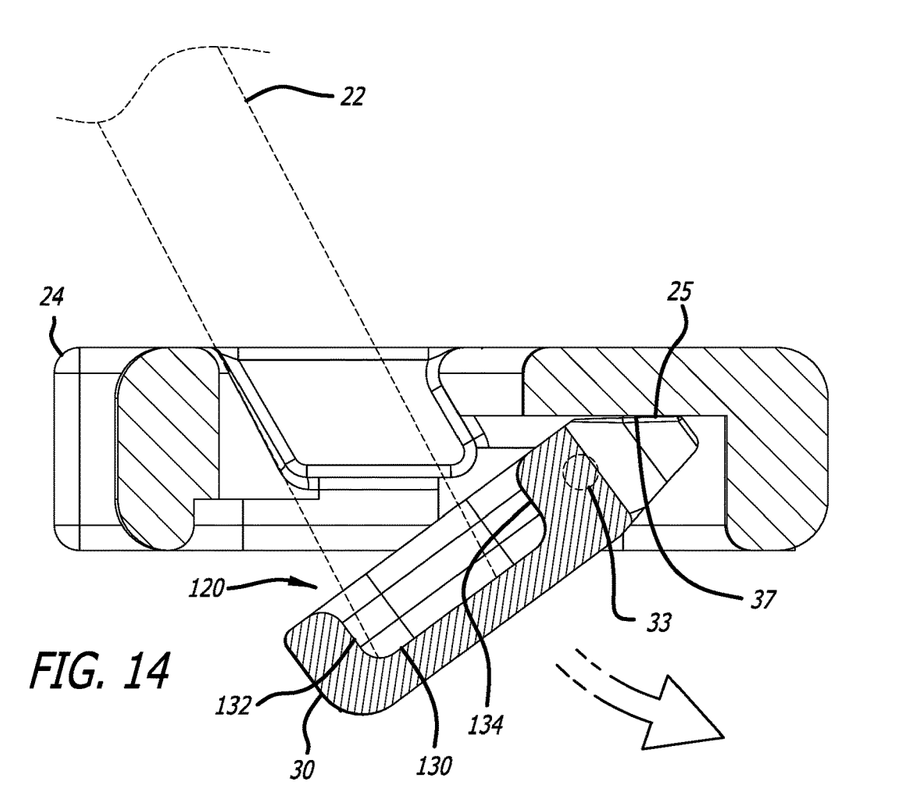
FIG. 14 is a cross-sectional side elevation view of the holder assembly in the deployed position, with the base in the deployed position holding a PED (shown in dashed lines for clarity).

The mount flap 30 rotates about a tilt axis 31 (running generally through a center of a pair of rotation pins 33, with each rotation pin 33 disposed on opposite sides of the mount flap 30) as the mount flap 30 is moved between its stowed and deployed positions. The mount flap 30 includes a pair of stops 35, with each stop 35 disposed on opposite sides of the mount flap 30. The rotation of the mount flap 30 about the tilt axis 31 relative to the holder 24 is limited by the stops 35 in order to allow the PED 22 to be more centered and, in the situation where the holder assembly 20 is deployed from the armrest 200 of an airline seat 202, positioned above a tray table 208 associated with the airline seat 202. A side 37 of the stop 35 is angled such that when that side 37 contacts a generally horizontal surface 25 of the holder 24, the mount flap 30 is generally at a forty five (45) degree angle relative to the generally horizontal surface 25. The mount flap 30 rotates between about zero (0) degrees from a horizontal, stowed position to about forty five (45) degrees from the horizontal, stowed position in the mount flap's 30 deployed position. When the holding assembly 20 is installed in the armrest 200, the holding assembly 20 in a generally horizontal orientation (when the armrest 200 itself is in a generally horizontal orientation).

Figure 6:
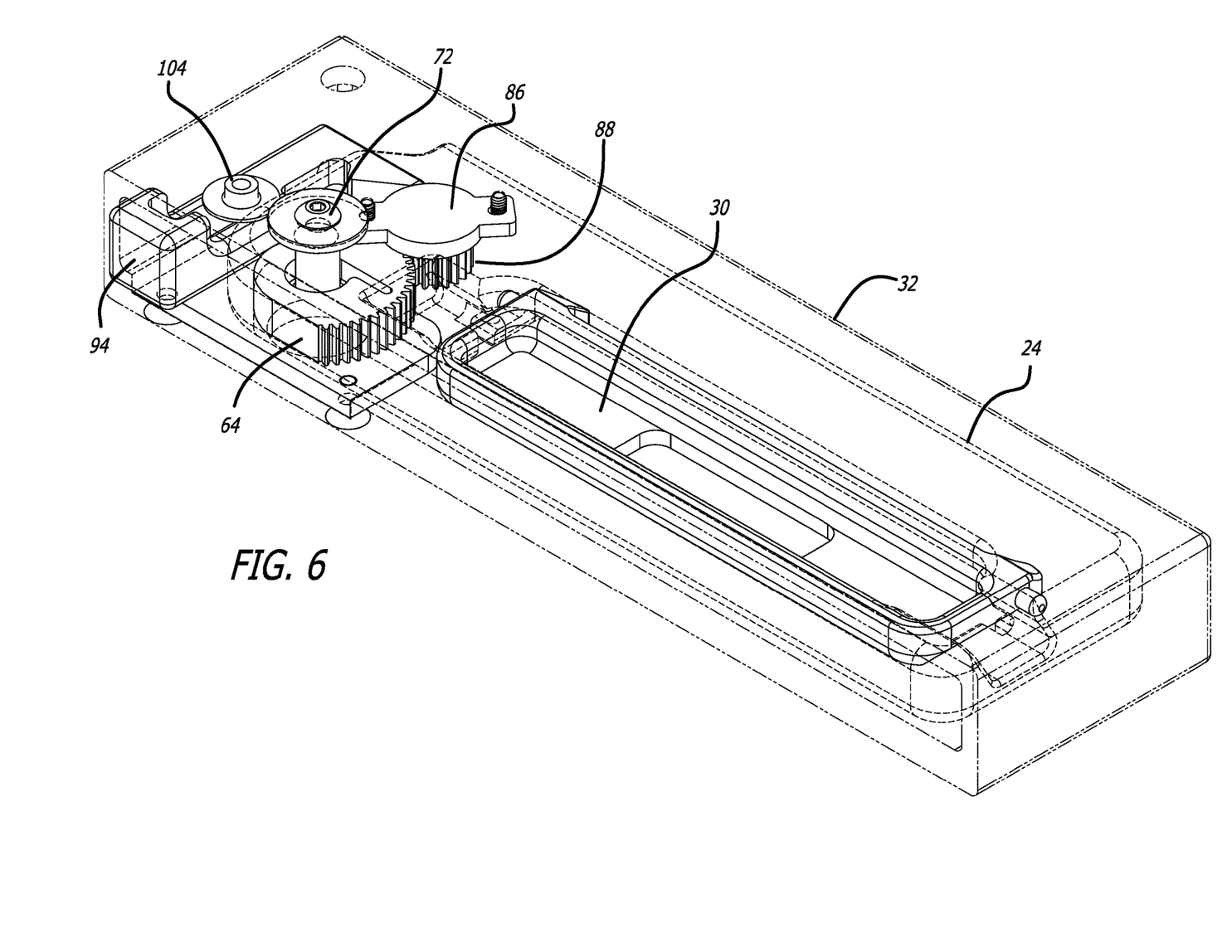
FIG. 6 is a perspective view of the holder assembly of FIG. 1 in a stowed configuration, with a latch assembly engaging the holder to keep the holder in its stowed position; and the broken lines representing a housing of the holder assembly, and dashed lines representing features of the holder assembly that would be hidden from view.
Figure 7:
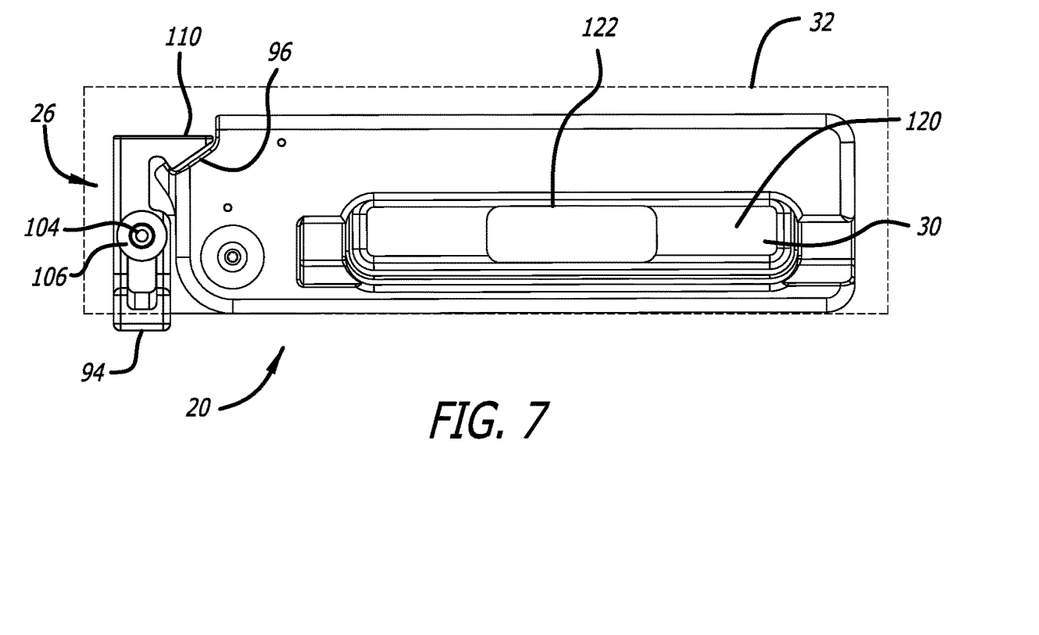
FIG. 7 is a top plan view of the holder assembly of FIG. 1 in a stowed configuration, with a latch assembly engaging the holder to keep the holder in its stowed position; and the dashed lines representing a housing of the holder assembly.
Figure 12:
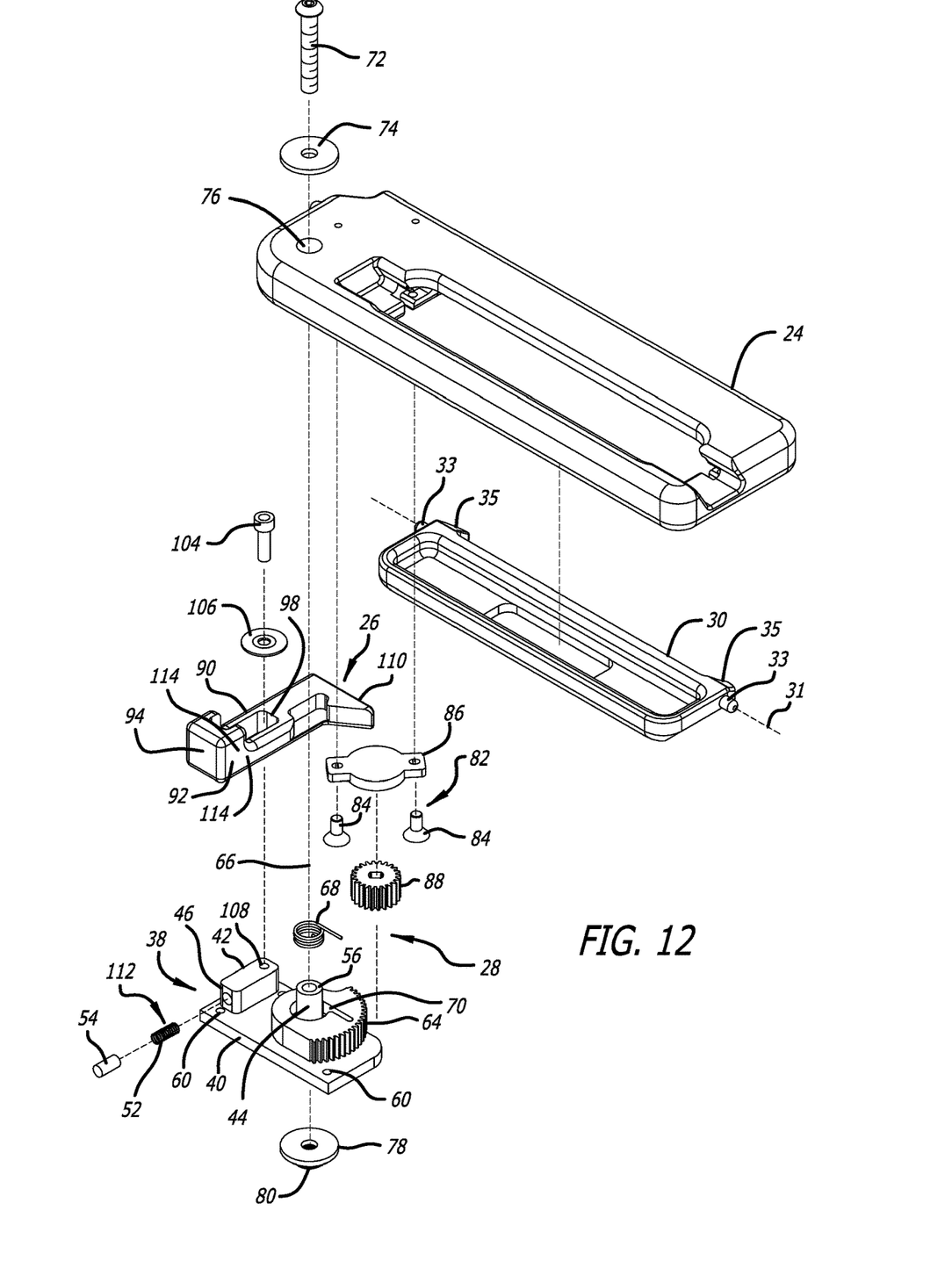
FIG. 12 is an exploded perspective view of the holder assembly of FIG. 1.

The holder assembly 20 further includes a casing or housing 32. The housing 32 generally contains the holder 24, the latch assembly 26, and the movement assembly 28 when the holder assembly 20 is in the stowed configuration. The holder 24 is generally disposed within the housing 32 when the holder 24 is in its stowed position, and extends outward from the housing 32 when the holder 24 is in its deployed position. The holder 24 is configured to rotate ninety (90) degrees between its stowed position and its deployed position. The housing 32 is generally rectangular bar-shaped with a generally rectangular bar-shaped interior recess 34 with a generally rectangular-shaped opening 36 on one side of the housing 32 providing access to the interior recess 34.

Figure 11:
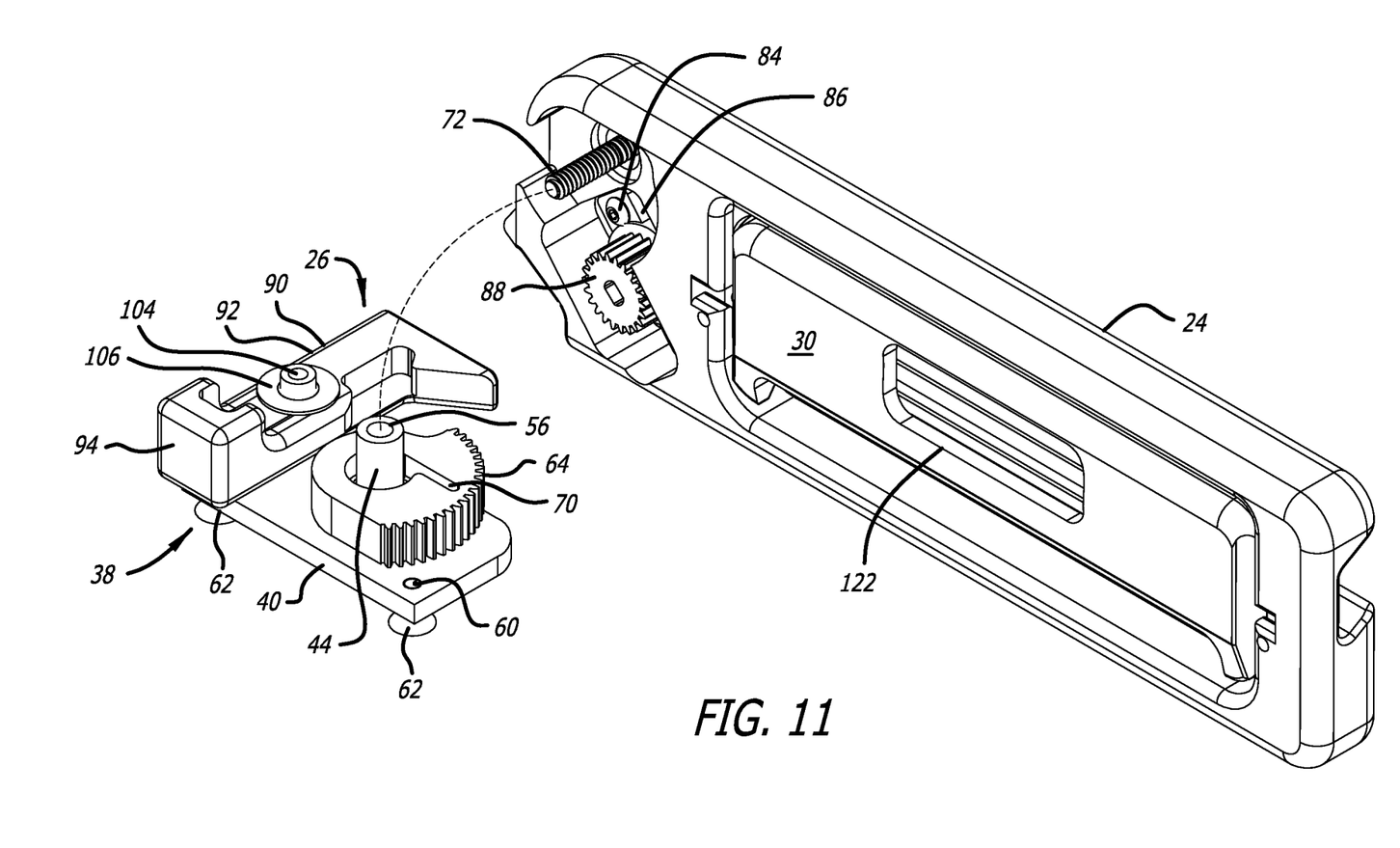
FIG. 11 is an exploded perspective view of the holder assembly of FIG. 1 with a gear insert assembly rotated ninety (90) degrees, and the dashed lines representing alignment of a fastener of the holder with a bore of a post extending upwardly from a gear insert assembly for engagement of the fastener and post.

A gear insert assembly 38 includes a generally rectangular base portion 40 having a generally bar-shaped guide portion 42, and a generally cylindrical post portion 44. The guide portion 42 and the post portion 44 each extend upwardly from a top surface of the base portion 40. The base portion 40 includes a number of bores 60 which engage fasteners 62 to secure the gear insert assembly 38 within the recess 34 of the housing 32. The fasteners 62 extend upwardly from a bottom side of the housing 32 through bores (not shown for clarity) in the housing 32 that are aligned with the bores 60 to secure the gear insert assembly 38 within the housing 32.

The holder assembly 20 further includes a biasing assembly 112 which includes the guide portion 42, a biasing element 52 (e.g., a spring), and a pin 54. The guide portion 42 includes a generally cylindrical bore 46 open on one side of the guide portion 42. The bore 46 extends longitudinally a distance into the guide portion 42 to a closed end 50. The biasing element 52, sized and shaped to fit within the bore 46 and move between compressed and uncompressed positions, is disposed in the bore 46 between the closed end 50 and the pin 54. The pin 54, sized and shaped to fit and move within the bore 46, is disposed in the bore 46 such that a portion of the pin 54 may extend outside the bore 46 when the spring 52 is fully extended, and disposed generally within the bore 46 when the spring 52 is compressed. The spring 52 provides a linear force against the pin 54 to push the pin 54 outside the bore 46. The post 44 includes a generally cylindrical bore 56 open on an upper side of the post portion 44 and extending longitudinally into the post portion 44.

The gear insert assembly 38 also includes a gear segment 64 disposed about the post portion 44. The gear segment 64 is symmetric about the post portion 44, and is only partially geared since there is only a rotation of approximately ninety (90) degrees. The gear segment 64 includes an axis of rotation that is co-axial with a vertical central axis 66 of the post portion 44. A rotational biasing element 68 (e.g., a torsion spring) is also disposed about the post portion 44, with one end of the biasing element 68 engaging the base portion 40 and the other end of the biasing element 68 engaging the gear segment 64. The gear segment 64 includes a cutaway portion 70 sized and shaped to receive the biasing element 68. The cutaway portion 70 extends all the way through the gear segment 64. A fastener 72 (e.g., a mechanical fastener including, without limitation, a bolt, a screw, a pin, or the like) extends through a washer 74 and a bore 76 in the holder 24 to extend into the bore 56 of the post portion 44. The fastener 72 extends through the bore 56, through a bore (not shown) in the base portion 40, and through a washer 78. A fastener 80 (e.g., a mechanical fastener including, without limitation, a nut, or the like) secures the fastener 72 in position. The holder 24 includes an axis of rotation that is co-axial with the vertical central axis 66 of the post portion 44.

The movement assembly 28 is configured to automatically move the holder 24 from its stowed position to its deployed position upon disengagement of a hook portion 110 from a latch portion 96. The movement assembly 28 is further configured to dampen deployment of the holder 24 from the stowed position towards the deployed position. A rotary damper assembly 82 is secured to the holder 24 by fasteners 84. The rotary damper assembly 82 includes a base plate 86 and a pinion 88 secured to the base plate 86. The pinion 88 is stationary and does not rotate. The movement assembly 28 includes the gear segment 64, the rotational biasing element 68, and the pinion 88 as the rotational biasing element 68 exerts torsional force against the gear segment 64, causing the gear segment 64 to automatically rotate about the axis 66. The engagement of the teeth of the gear segment 64 and the teeth of the pinion 88 transfers the torsional force to the holder 24 which, in turn, causes the holder 24 to rotate about the axis 66. The asymmetrical exterior cam-shape of the gear segment 64 provides the dampening effect that works against the torsional force provided by the rotational biasing element 68. In the alternative, the movement assembly 28 could include a symmetrical gear segment that did not provide resistance to the torsional force provided by the rotational biasing element 68.

The gear insert assembly 38 additionally includes a latch body portion 90. The latch assembly 26 includes the latch body portion 90 and the hook portion 110 of the holder 24. The latch body portion 90 includes a main body portion 92 having a button portion 94 on a first end and the hook portion 110 on a second end generally opposite the first end. A side of the main body portion 92 acts as a stop portion 114 preventing rotational movement of the holder 24 beyond the deployed position. The holder 24 includes a stop portion 118 preventing rotational movement of the holder 24 beyond the stowed position due to a side 116 of the gear segment 64 contacting the stop portion 118.

The main body portion 92 further includes a track or slot 98 formed therein that is sized and shaped to receive the guide portion 42 of the gear insert assembly 38 therein. The longitudinal length of the slot 98 is longer than the longitudinal length of the guide portion 42, and the guide portion 42 is able to slidably move within the slot 98 between first and second ends 100, 102 of the slot 98. The length of the slot 98 limits movement of the guide portion 42 relative to the latch body portion 90, and movement of the latch body portion 90 relative to the guide portion 42 of the biasing assembly 112. The latch body portion 90 is secured to gear insert assembly 38 by a fastener 104 (e.g., a mechanical fastener including, without limitation, a bolt, a screw, a pin, or the like) extending through a washer 106 having a larger diameter than the width of the slot 98. The securement of the washer 106 against the main body portion 92 keeps the guide portion 42 in engagement with the slot 98. The fastener 104 extends into a bore 108 that passes through the guide portion 42 and base portion 40. The bore 108 is threaded to engage the fastener 104. The latch portion 96 of the holder 24 is sized, shaped, and configured to engage the hook portion 110 of the holder 24.

Figure 8:
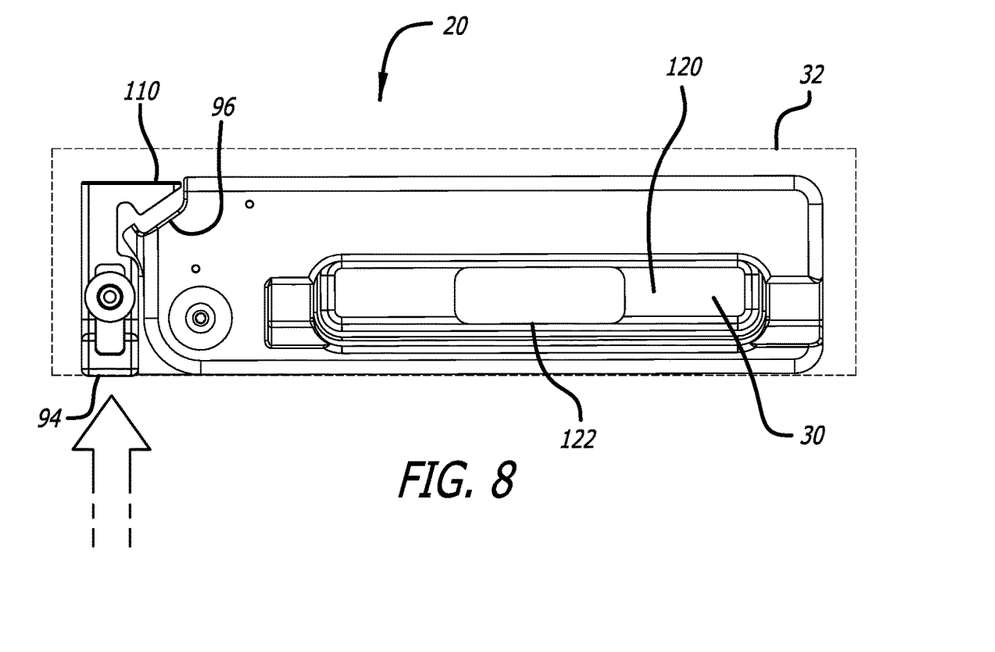
FIG. 8 is a top plan view of the holder assembly of FIG. 1 in a stowed configuration, with a release button in a depressed position and the latch assembly disengaged from the holder, allowing the holder to move from its stowed position to its deployed position; and the dashed lines representing a housing of the holder assembly, with an arrow indicating a direction of force applied to the release button.
Figure 9:
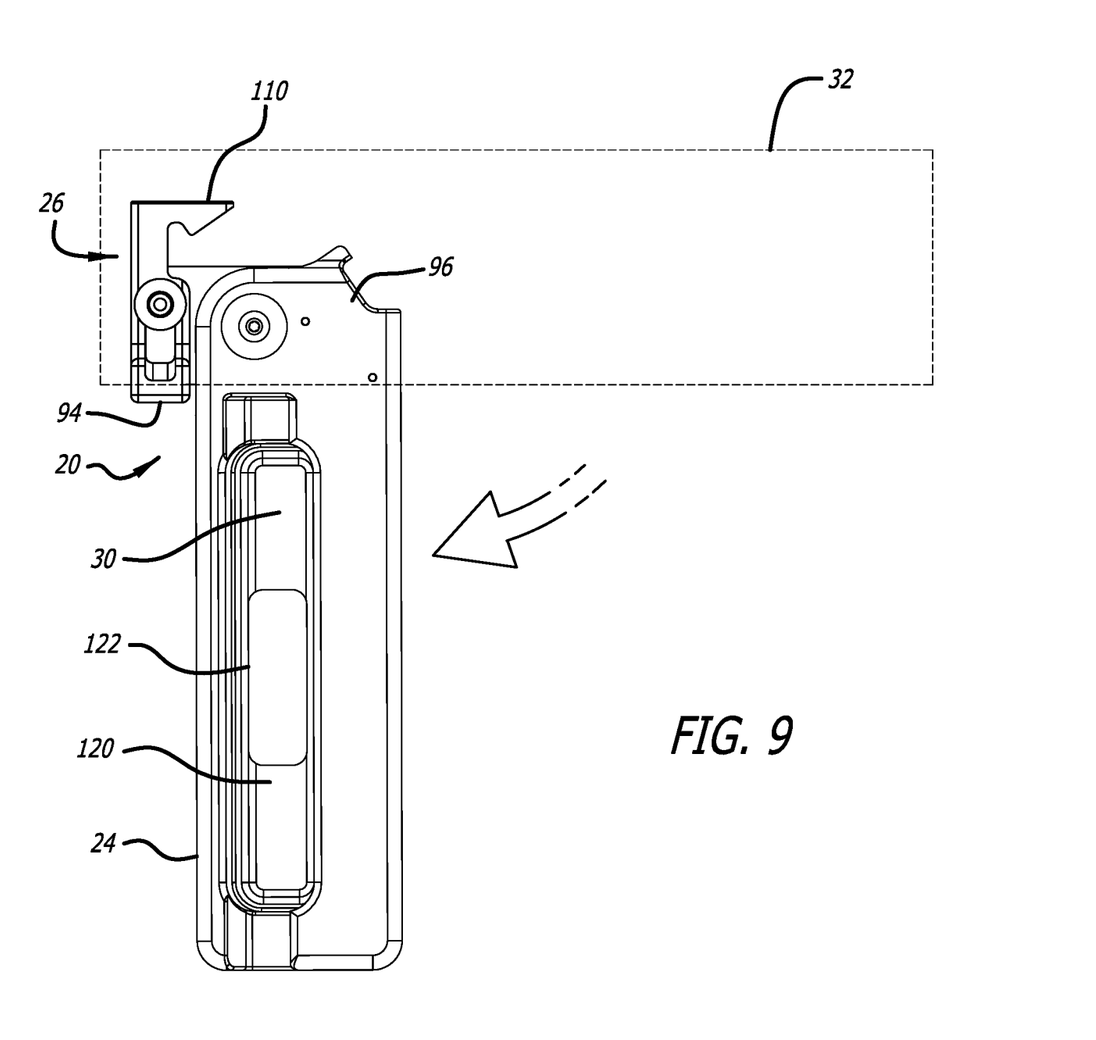
FIG. 9 is a top plan view of the holder assembly of FIG. 1 in a partially deployed configuration, with the release button in a depressed position, the latch assembly disengaged from the holder, and the holder in its deployed position (with an arrow indicating a direction of rotational deployment of the holder from within a recess of the armrest, and the dashed lines representing a housing of the holder assembly)
Figure 10:
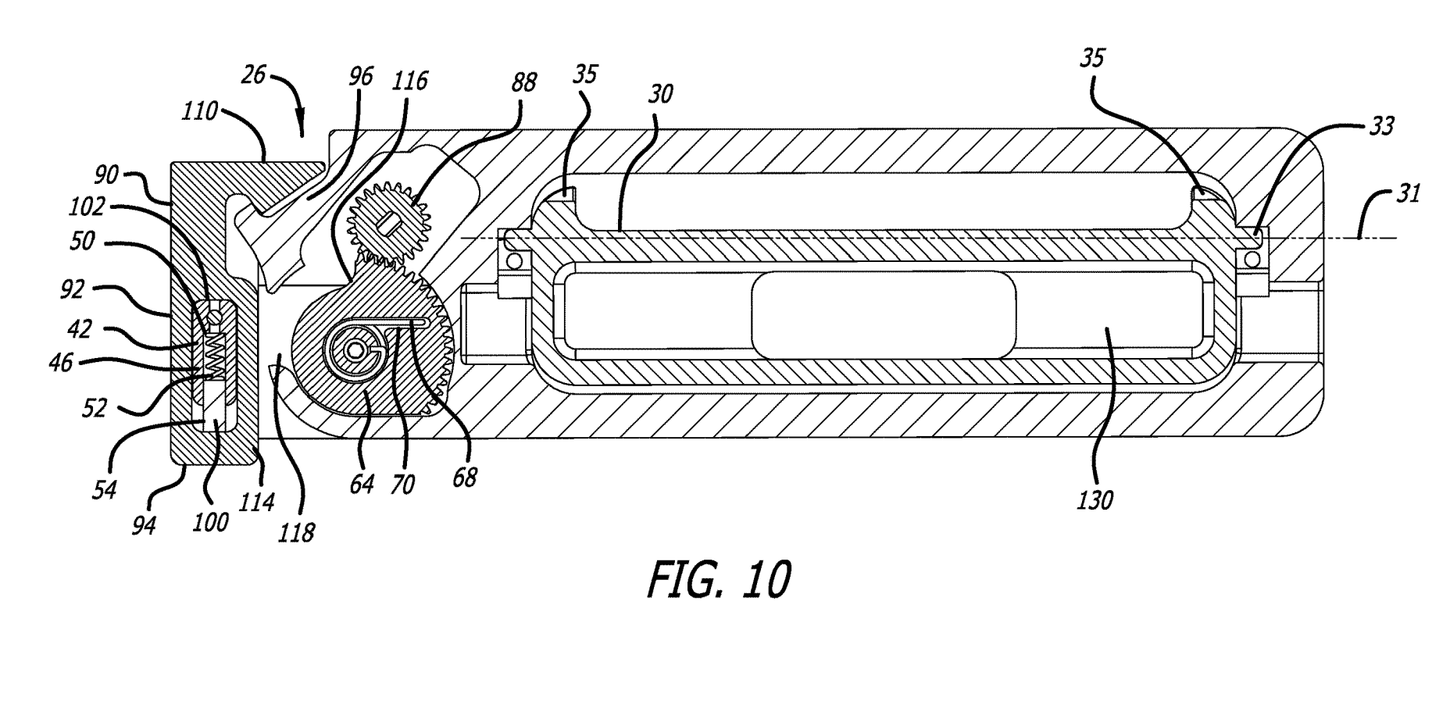
FIG. 10 is a top plan cross-sectional view of the holder assembly of FIG. 7.

The button portion 94 is configured to be pressed by a user. Pressing the button portion 94 moves the button portion 94 of the latch body portion 90 from an undepressed position towards a fully depressed position. At some point as the latch body portion 90 moves from the undepressed position towards the depressed position, the hook portion 110 disengages from the latch portion 96 of the holder 24. When the guide portion 42 is disposed within the slot 98, the spring 52 exerts linear force against the pin 54 and pushes the pin 54 against the end 100 of the slot 98 of the latch body portion 90 which, in turn, pushes a side of the guide portion 42 against the end 102 of the slot. As the latch body portion 90 moves from the undepressed position towards the fully depressed position, the end 100 of the slot 98 presses against the pin 54, which in turn pressed against and compresses the spring 52. Due to decompression of the spring 52, the biasing assembly 112 is configured to automatically move the button portion 94 from the depressed position to the undepressed position. Once the user stops applying force to the button portion 94, the compressed spring 52 provides a linear force against the pin 54 to push the pin 54 against the end of the slot 98, which in turn moves the button portion 94 of the latch body portion 90 towards the undepressed position.

Figure 1:
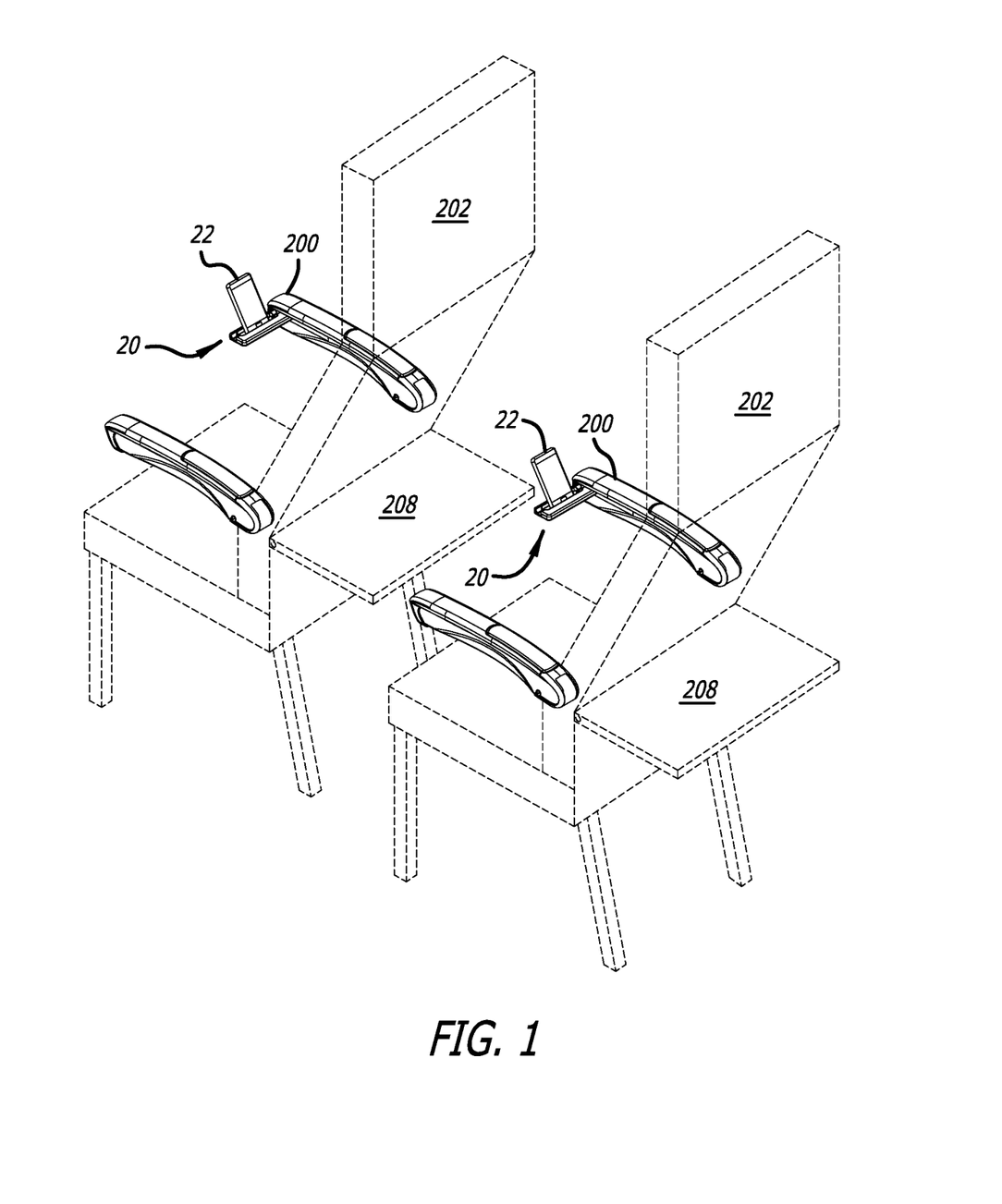
FIG. 1 is a perspective view of a two reclining seats, where each reclining seat includes a table tray (seen in a generally horizontal deployed configuration), and an armrest that includes a holder assembly illustrating an embodiment of the present invention in a fully deployed configuration holding a PED.
Figure 2:
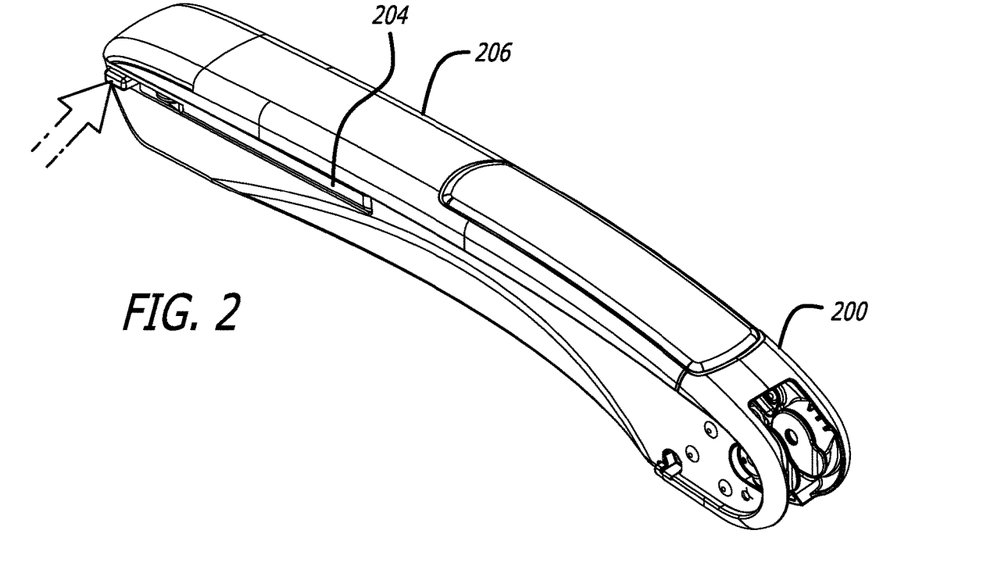
FIG. 2 is a perspective view of the armrest of FIG. 1, with the holder assembly in a stowed configuration, with an arrow indicating a direction of force applied to a release button.
Figure 3:
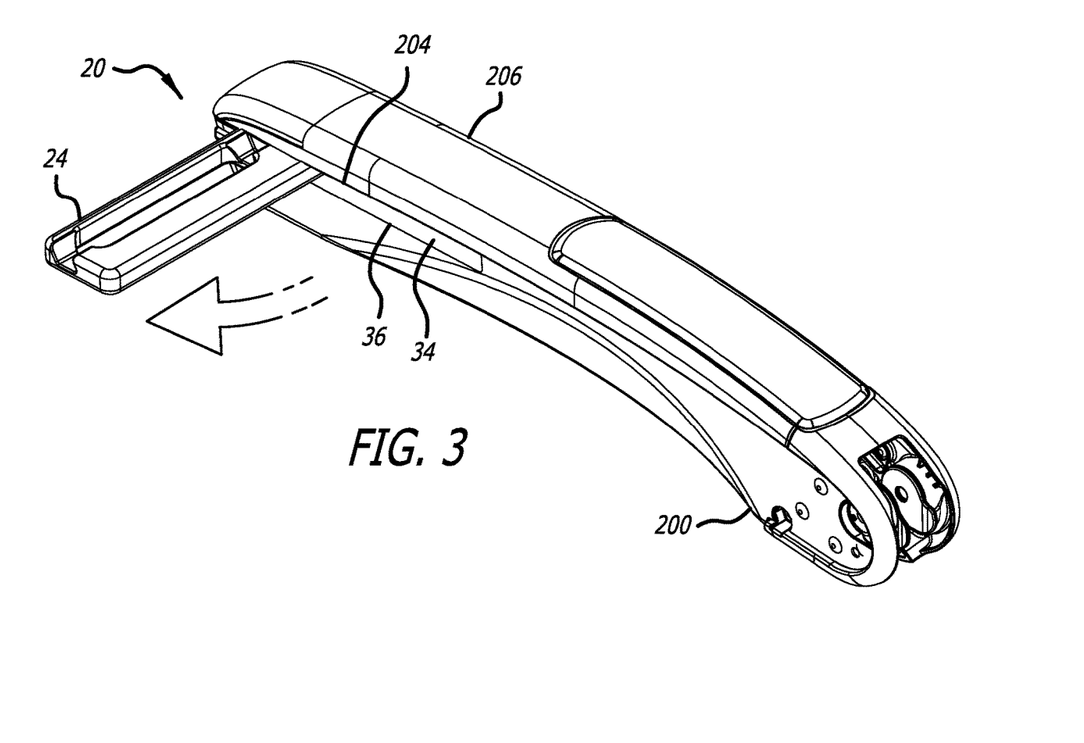
FIG. 3 is a perspective view of the armrest of FIG. 2 with the holder assembly in a partially deployed configuration; a holder of the holder assembly in its deployed position (with an arrow indicating a direction of rotational deployment of the holder from within a recess of the armrest); and a base of the holder in its stowed position.

The holder assembly 20 is disposed in an armrest 200 of a seat 202. The housing 32 of the holder assembly 20 is secured within a recess 204 of the armrest 200 that is sized, shaped, and configured to receive the housing 32. The recess 204 may be formed as part of a removable armrest cap 206 of the armrest 200. The armrest cap 206 is removably attachable to the armrest 200 in a variety of conventional ways that include, without limitation, mechanical fasteners (e.g., nuts and bolts, screws, snap-detent fit, etc.), chemical fasteners (e.g., glue) and the like, either alone or in combination. For example, when retro-fitting an existing passenger seat on an aircraft, instead of replacing an entire armrest to allow for the holder assembly 20, only the armrest cap 206 needs to be replaced, and this makes it easier to service and/or replace a holder assembly 20. A USB port could be installed in the closeout cap to allow for charging of a PED (via an appropriate charging cable) while in use, with the USB port connected to the aircraft's electrical system. The armrest cap 206 is used on every passenger seat and replacing the entire armrest 200 is more costly than simply replacing the armrest cap.

In use, the deployment stages required to bring the mounting arm assembly 20 to a proper viewing position of a PED 22 held by the holder assembly 20 are as follows: stowed configuration, semi-deployed configuration, and deployed configuration. In the stowed configuration, the holder assembly 20 is contained in the recess 204 of the armrest 200 (for purposes of illustration only, the armrest 200 is the passenger's right armrest, and the following steps can be adopted and modified for the situation where the holder arm assembly 20 is stowed within a passenger's left armrest, with the goal that the holder assembly 20 be deployed generally forward of the passenger). Alternatively, the holder assembly 20 may be stowed within a recess of a space within a housing or console, in a space between passenger chairs, or in a space between a passenger chair and a bulkhead, and so on. In any event, in the stowed configuration, the holder assembly 20 is out of sight of the passenger except for a side of the holder assembly 20 facing outwardly from the recess 204.

In the semi-deployed configuration, the holder 24 of the holder assembly 20 is rotationally pivoted from a stowed position within the recess 34 to a deployed position generally ninety (90) degrees to the stowed position of the holder 24. This is accomplished by the user applying force (indicated by the arrow seen in FIGS. 2 and 8) against the button portion 94 and pushing the latch body portion 90 inwards such that the slot 98 moves linearly relative to the guide portion 42. Before force is applied by the user to the latch body portion 90, the guide portion 42 is in contact with the second end 102 of the slot 98 due to the biasing element 52 pushing the pin 54 against the first end 100 of the slot 98. As stated above, at some point as the latch body portion 90 moves from the undepressed position towards the depressed position, the hook portion 110 disengages from the latch portion 96 of the holder 24. As the latch body portion 90 moves from the undepressed position towards the fully depressed position, the first end 100 of the slot 98 presses against the pin 54, which in turn pressed against and compresses the spring 52. After disengagement of the hook portion 110 from latch portion 96, the holder 24 will begin to rotate from the stowed position of the holder 24 due to the movement assembly 28 providing rotational force to the holder 24. The cam-shape of the gear segment 64 dampens deployment of the holder 24. Once the holder 24 rotates away from its stowed position, the user can stop applying force to the button portion 94, allowing the biasing element 52 to decompress, causing the pin 54 to press against the first end 100 of the slot 98, and move the button portion 94 (along with the latch body portion 90) outwards from the depressed position to the undepressed position. Due to rotation of the holder 24 away from its stowed position, the hook portion 110 will not be able to re-engage the latch portion 96 of the holder 24. The holder 24 will rotate from its stowed position to its deployed position where a side of the holder 24 will engage the stop portion 114 of the latch body portion 92, preventing rotational movement of the holder 24 beyond the deployed position.

Once the holder 24 is in the semi-deployed configuration, the holder assembly 20 is moved to its deployed configuration by the user rotating the mount flap 30 about the tilt axis 31 until the sides 37 of the stops 35 contacts the generally horizontal surface 25 of the holder 24. A PED 22 can then be placed within the holding portion 120. In general, the holder assembly 20 can be returned to the stowed configuration by applying force to the holder 24 to rotate the holder 24 back into the recess 34. At some point as the holder 24 is rotated back into the recess 34, the hook portion 110 and the latch portion 96 (being sized, shaped, and configured to automatically engage each other) will engage each other and retain the holder 34 within the recess 34 in the stowed configuration.

In the alternative, the holder assembly 20 is attachable to a surface (not shown) within a recess of a vehicle (e.g., aircraft) bulkhead, a console housing or compartment located next to or part of a vehicle passenger seat or chair, or the like. The holder assembly 20 may be connected to the armrest 200 or armrest cap 206 using mechanical fasteners (e.g., screws, nuts and bolts, etc.), or chemical fasteners (e.g., glue, adhesive, etc.) or the like. In the alternative, the housing 32 of the holder assembly 20 may be formed of single-piece construction with the armrest 200 or armrest cap 206 or another surface (e.g., formed as part of a seating console in a passenger aircraft).

Although the present invention has been discussed above in connection with use on a passenger aircraft, the present invention is not limited to that environment and may also be used on passenger trains, cars, buses and other vehicles including, but not limited to, carts, carriages, and means of transportation mounted on rails.

Likewise, the present invention is also not to be limited to use in vehicles and may be used in non-vehicle or stationary environments where there is seating, and it is desirable to stow and deploy holders for holding PEDs, such as restrooms, sports stadiums, film sets, schools, hospitals, factories, garages, offices, shipyards, construction sites and the like. Furthermore, the present invention is also not to be limited to use in connection with seating, and may be used in any environment where the device may be stowed within and deployed from a recess formed in a surface (e.g., a wall, a desktop, a table), or attached to a flat surface (e.g., a wall, a desktop, a table) that does not have a recess into which the device may be stowed.

Furthermore, the present invention is not limited to use with PEDs, and may be used with a wide variety of electronic, mechanical, electro-mechanical, or other devices or objects, such as books, magazines, photographs, paper pads, keypads, illumination sources, cameras, or any other kind of screen display, tool, or other component.

In addition, the claimed invention is not limited in size and may be constructed in miniature versions or for use in very large-scale applications in which the same or similar principles of motion and friction control as described above would apply. Furthermore, the figures (and various components shown therein) of the specification are not to be construed as drawn to scale.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

More generally, the word "assembly" may reflect an actual physical grouping of distinct components in a single physical assemblage or a combination of physical and/or functional interaction of portions of one or more distinct components where one or more of the components can serve a particular function as a part of one assembly and other particular function(s) as part of one or more other assemblies. In other words, a single component can serve different functions as part of different assemblies.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "front," "rear," "left," "right," "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The above description presents the best mode contemplated for carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above that are fully equivalent. Consequently, this invention is not limited to the particular embodiments disclosed. On the contrary, this invention covers all modifications and alternate constructions coming within the spirit and scope of the invention as generally expressed by the following claims, which particularly point out and distinctly claim the subject matter of the invention.

What is claimed is:

1. A holder assembly movable between stowed and deployed configurations, comprising:
   a holder having a longitudinal length, wherein the holder includes a flap configured to support a personal electronic device; wherein the holder is configured to laterally rotate between stowed and deployed positions, and the flap is disposed along at least a portion of the longitudinal length of the holder;
   a latch assembly configured to engage the holder in the stowed position; and
   a movement assembly configured to automatically move the holder from the stowed position to the deployed position upon disengagement of the holder and latch assembly.

2. The assembly of claim 1, further including a housing within which the holder is disposed when the holder is in the stowed position.

3. The assembly of claim 1, wherein the flap is movable between stowed and deployed positions.

4. The assembly of claim 1, wherein the latch assembly includes a main body having a latch portion configured to engage a portion of the holder sized and shaped to engage the latch portion.

5. The assembly of claim 1, wherein the latch assembly includes a main body having a stop portion preventing rotational movement of the holder beyond the deployed position.

6. The assembly of claim 1, wherein the latch assembly includes a main body having a button portion configured to move between depressed and undepressed positions, wherein the latch assembly disengages from the holder after the button portion moves from the undepressed position.

7. The assembly of claim 1, further including a biasing assembly, wherein the latch assembly includes a main body having a button portion configured to move between depressed and undepressed positions, and the biasing assembly is configured to automatically move the button portion from the depressed position to the undepressed position.

8. The assembly of claim 1, further including a biasing assembly, wherein the latch assembly includes a main body having a slot configured to engage a portion of the biasing assembly, and the slot limits movement of the main body relative to the biasing assembly.

9. The assembly of claim 1, wherein the flap includes a recess configured to receive a portion of the personal electronic device, and an aperture configured for a cable to pass through to engage the personal electronic device.

10. The assembly of claim 1, wherein the movement assembly is further configured to dampen deployment of the holder from the stowed position.

11. The assembly of claim 1, further including a biasing assembly having a main body, a pin, and a biasing element, wherein the main body includes a bore configured to receive the biasing element and the pin, and wherein the pin engages the latch assembly.

12. An armrest assembly, comprising:
    an armrest; and
    a holder assembly movable between stowed and deployed configurations, wherein the holder assembly is generally disposed within the armrest in the stowed configuration, and wherein the holder assembly comprises:
        a holder having a longitudinal length, wherein the holder includes a flap configured to support a personal electronic device; wherein the holder is configured to laterally rotate between stowed and deployed positions relative to the armrest, and the flap is disposed along at least a portion of the longitudinal length of the holder;
        a latch assembly configured to engage the holder in the stowed position; and
        a movement assembly configured to automatically move the holder from the stowed position to the deployed position upon disengagement of the holder and latch assembly.

13. The assembly of claim 12, wherein the holder assembly further includes a housing within which the holder is disposed when the holder is in the stowed position.

14. The assembly of claim 12, wherein the flap is movable between stowed and deployed positions.

15. The assembly of claim 12, wherein the latch assembly includes a main body having a latch portion configured to engage a portion of the holder sized and shaped to engage the latch portion.

16. The assembly of claim 12, wherein the latch assembly includes a main body having a stop portion preventing rotational movement of the holder beyond the deployed position.

17. The assembly of claim 12, wherein the latch assembly includes a main body having a button portion configured to move between depressed and undepressed positions, wherein the latch assembly disengages from the holder after the button portion moves from the undepressed position.

18. The assembly of claim 12, wherein the holder assembly further includes a biasing assembly having a main body, a pin, and a biasing element, wherein the main body includes a bore configured to receive the biasing element and the pin; wherein the latch assembly includes a main body having a button portion configured to move between depressed and undepressed positions, and a slot configured to engage the main body of the biasing assembly; and wherein the biasing element biases the pin against the main body of the latch assembly to automatically move the button portion from the depressed position to the undepressed position, and the slot limits movement of the main body of the latch assembly relative to the main body of the biasing assembly.

19. The assembly of claim 12, wherein the flap includes a recess configured to receive a portion of the personal electronic device, and an aperture configured for a cable to pass through to engage the personal electronic device.

20. The assembly of claim 12, wherein the movement assembly is further configured to dampen deployment of the holder from the stowed position.

\* \* \* \* \*